(12) United States Patent
Henderer et al.

(10) Patent No.: US 9,011,050 B2
(45) Date of Patent: Apr. 21, 2015

(54) CHIP-RESISTANT CUTTING TAP

(75) Inventors: Willard E. Henderer, Evans, GA (US);
Stephen Michael George, Greensboro, NC (US); Timothy Austin Moore, Asheboro, NC (US)

(73) Assignee: Kennametal Inc, Latrobe, PA (US)

( * ) Notice: Subject to any disclaimer, the term of this patent is extended or adjusted under 35 U.S.C. 154(b) by 249 days.

(21) Appl. No.: 13/413,942

(22) Filed: Mar. 7, 2012

(65) Prior Publication Data

US 2013/0236260 A1    Sep. 12, 2013

(51) Int. Cl.
*B23G 5/06* (2006.01)

(52) U.S. Cl.
CPC ........................................ *B23G 5/06* (2013.01)

(58) Field of Classification Search
CPC ......................................................... B23G 5/06
USPC .................. 408/222, 215, 219, 220; 407/198; 470/198

See application file for complete search history.

(56) References Cited

U.S. PATENT DOCUMENTS

| | | | |
|---|---|---|---|
| 700,892 A * | 5/1902 | Bewicke | 408/222 |
| 6,918,718 B2 * | 7/2005 | Schwarz | 408/222 |

| | | | |
|---|---|---|---|
| 2010/0221077 A1 | 9/2010 | Nash et al. | |
| 2011/0085867 A1 | 4/2011 | Ellis | |

FOREIGN PATENT DOCUMENTS

| | | | |
|---|---|---|---|
| EP | 286485 A1 * | 10/1988 | |
| FR | 2610555 A1 * | 8/1988 | |
| FR | 2623114 A2 * | 5/1989 | |
| GB | 1090875 A * | 11/1967 | |
| JP | 06179121 A * | 6/1994 | |
| SU | 541606 A * | 3/1977 | |
| SU | 1480986 A * | 5/1989 | |
| SU | 1799699 A2 * | 3/1993 | |

* cited by examiner

*Primary Examiner* — Eric A Gates
*Assistant Examiner* — Nicole N Ramos
(74) *Attorney, Agent, or Firm* — Larry R. Meenan

(57) ABSTRACT

A cutting tap includes a body having an axial forward end and an axial rearward end. The body has a threaded body portion with spiral flutes adjacent the axial forward end, a cylindrical shank portion adjacent the axial rearward end. The threaded body portion includes a chamfered fluted section and a constant diameter section. The threads have a chamfer relief extending radially inward from the cutting edge to a heel of a land. The amount of chamfer relief reaches a maximum value at a point between the cutting edge and the heel, and then becomes smaller between the point of maximum relief and the heel of the land to provide a clearance that reduces the propensity of the tap to chip.

8 Claims, 6 Drawing Sheets

CHIP-RESISTANT CUTTING TAP

FIELD OF THE INVENTION

In general, the invention relates to a cutting tap, and in particular to a cutting tap that has a geometry that extends the tap's life by reducing chipping when the tap reverses while still engaged in cutting a thread.

BACKGROUND OF THE INVENTION

Mechanisms and machine components requiring screw threads have a long history in technology. Specifically, the application of screw threads as fastener components dominates over all other means to join parts into assemblies. Although there are many ways to generate screw threads both internal as well as external, experience has shown that taps are the favored means to generate the internal screw thread. There currently exist two tapping methods to generate internal screw threads. The dominant tapping method is by cutting and removing material from the walls of a hole to produce a helical V shaped screw thread. Alternatively, internal screw threads can be created by displacing material to form an internal screw thread. However, tapping by cutting material is generally favored since this method requires lower torque and produces a more perfect thread form.

The dimensional accuracy of the shape and size of the internal screw thread controls the precision and fit of the screw thread assembly. Additionally, the speed of tapping affects the cost to produce an internal screw thread.

There are two materials used to manufacture cutting taps. High-speed steel is widely used for taps because of its high strength. However cemented tungsten carbide is favored as a material for manufacturing other cutting tools over high-speed steel owing to properties such as higher hardness and high temperature stability including the ability to retain hardness at high temperatures. Unfortunately tungsten carbide has lower strength than high-speed steel and is more prone to chipping. The use of tungsten carbide for taps can be expanded by making taps more resistant to chipping through improved tool geometries.

Unlike other cutting tools, taps must reverse rotational direction for removal from the hole after completing a thread. Generally, tapped holes have two basic configurations. Referred to as a through hole, the predrilled hole extends through the thickness of the part. In the case of a through hole, the tap's chamfered cutting section can extend past the bottom of the part and is no longer engaged in the part when reversed. The other situation, referred to as a blind hole, exists where the depth of predrilled hole terminates before reaching the thickness of the part. When tapping a blind hole, the tap can only thread a portion of the drilled hole's depth and therefore the tap is still cutting a thread when it completes the required threading depth and reverses. This situation results in high stresses imposed on the chamfered cutting edges and chipping.

Cutting taps of the current art have a propensity to chip especially when they are still engaged in the work when they reverse, such as when tapping a blind hole.

FIGS. 7A-C show the problem associated with taps of the current art when the tap reverses when still engaged with the workpiece. Rotating for illustration in the counterclockwise direction, the tap generates a chip at the cutting edge (FIG. 7A). The form of the chip depends on the work material. Ductile materials tend to form a long chip like shown. At the moment the tap reaches the required depth, it stops and reverses. The recently created chips are attached to the wall of the hole. Now, rotating in the clockwise direction, the tap's chamfer must ride over the chips attached to hole. Owing to the space formed by the chamfer relief, the chip can become wedged between chamfer surface and the wall of the hole (FIG. 7B). As the tap further rotates in reverse, the wedged chip creates high pressure on the cutting edge, causing the cutting edge to chip (FIG. 7C).

Depending on ductility and hardness, tapped work materials produce different chip shapes. The tap flute helix is varied according to the chip. For example, straight flute taps are used with materials like iron that produce very short chips. Straight flute taps generally cannot be used for tapping blind holes in ductile materials. Since the chips are long, they build up and bind in the flutes causing high tapping torque and frequently breakage. Spiral fluted taps are used in blind holes in ductile materials since the angle of the helix forces the chip out of the hole as the tap advances.

The remedy currently employed by prior art taps is to reduce the amount of chamfer relief on taps used in blind holes. But as previously mentioned, this will cause increased rubbing between tap and workpiece and shorten the life of tap.

SUMMARY OF THE INVENTION

The invention solves the problem of taps having a propensity to chip when being removed from the hole is solved by providing a spiral-flute cutting tap with teeth having a chamfer surface with a maximum chamfer relief angle less than the land angle, thereby producing a clearance between the point of maximum chamfer relief angle and the land. Since spiral-flute taps remove chips from the hole during tapping, they are particularly effective for tapping blind holes in ductile materials.

In one aspect of the invention, a cutting tap comprises a body having an axial forward end and an axial rearward end. The body has a threaded body portion with spiral flutes adjacent the axial forward end, a cylindrical shank portion adjacent the axial rearward end and a central, longitudinal axis. The threaded body portion includes a chamfered fluted section and a constant diameter fluted section. The chamfered fluted section extends from the axial forward end and terminates at the constant diameter fluted section. The constant diameter fluted section includes a cutting thread. A cutting edge is formed at an intersection between a flute and the cutting thread. A chamfer relief surface extends radially inward from the cutting edge to a heel of a land. An amount of chamfer relief is proportional to an angle measured from the cutting edge. The amount of chamfer relief reaches a maximum value at a point between the cutting edge and the heel. The chamfer relief surface extends between the point and the heel is directed radially outward so as to form a clearance at the heel of the land that is smaller than the maximum value of the chamfer relief.

In another aspect of the invention, a cutting tap comprises a body having an axial forward end and an axial rearward end. The body has a threaded body portion with spiral flutes adjacent the axial forward end, a cylindrical shank portion adjacent the axial rearward end and a central, longitudinal axis. The threaded body portion includes a chamfered fluted section and a constant diameter fluted section. The chamfered fluted section extends from the axial forward end and terminates at the constant diameter fluted section. The constant diameter fluted section includes a cutting thread. A cutting edge is formed at an intersection between a flute and the cutting thread. A chamfer relief surface extends radially inward from the cutting edge to a heel of a land. An amount of chamfer relief is proportional to an angle measured from the cutting edge. The chamfer relief reaches a maximum value at a point between the cutting edge and the heel. An angle of maximum chamfer relief is not equal to a land angle.

In another aspect of the invention, a method of making a cutting tap, comprising the steps of:

grinding a cylindrical shank to form a cylindrical shank portion at the axially rearward end of the tap and a threaded body portion having a major diameter at an axially forward end of the tap;

grinding a spiral flute in the threaded body portion to form a cutting edge;

grinding the threaded body portion with a taper to form a chamfered fluted section with a chamfer surface at the axially forward end of the tap; and grinding the threaded body portion to form a thread with a land by moving a grinding wheel radially inward as the tap is rotated away from a cutting edge to form a chamfer relief, whereby the chamfer relief reaches a maximum at a point between the cutting edge and the land of the thread.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
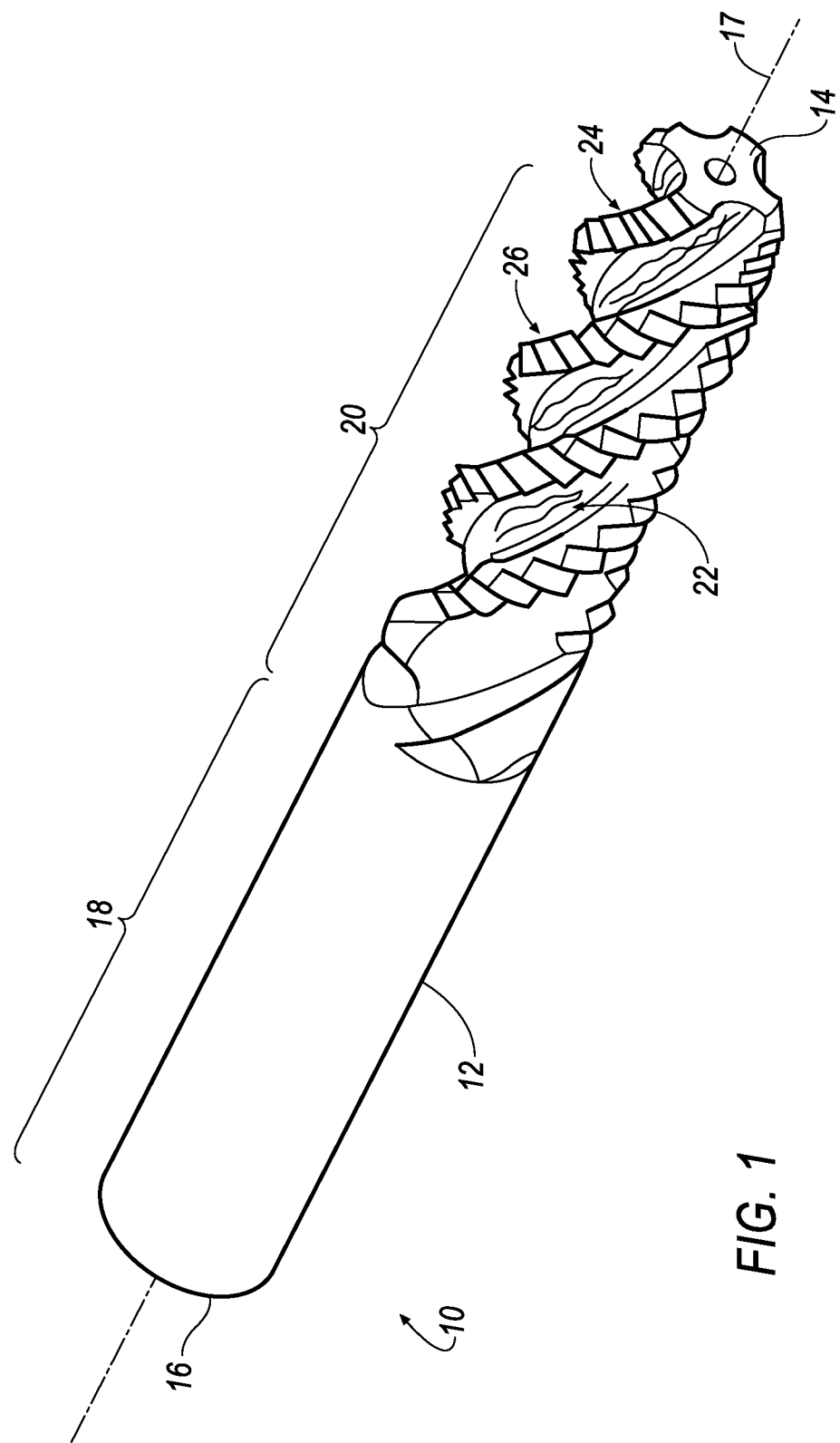
FIG. 1 is an isometric view of an exemplary embodiment of a spiral-fluted cutting tap of the invention.
Figure 2:
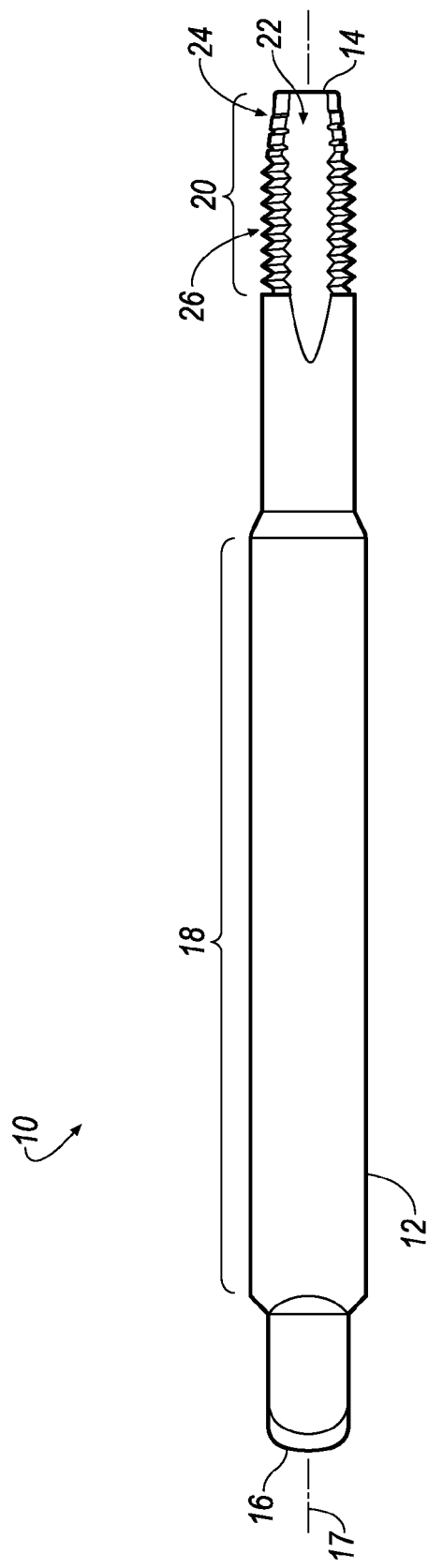
FIG. 2 is a side view of an exemplary embodiment of a straight-fluted cutting tap of the invention.

Referring now to FIGS. 1 and 2, a cutting tap 10 with spiral flutes 22 is shown according to an embodiment of the invention. The cutting tap 10 has an elongate body 12 with an axial forward end 14 and an axial rearward end 16. The cutting tap 10 has a cylindrical shank portion (bracket 18) adjacent to the axial rearward end 16 and a threaded body portion (bracket 20) adjacent to the axial forward end 14, and a central, longitudinal axis 17. The shank might optionally have a square for securing the tap from turning in the holder.

The cutting tap 10 is operatively connected by a holder to a machine tool or the like at the cylindrical shank portion 18 thereof. The threaded body portion 20 has a chamfered fluted section 24 beginning at the axial forward end 14 and extending in an axial rearward direction therefrom. The chamfered region 24 joins a constant diameter (or finishing) section 26 that extends in the axial rearward direction terminating at the juncture with the cylindrical shank portion 18.

It will be appreciated that the above description for the spiral flute tap 10 can be applied to a straight flute tap, as shown in FIG. 1

In regard to specific tapping applications, spiral flute taps with a right hand helix pull the chips out of the hole (right hand thread) and are effective in blind holes. Left hand spiral fluted taps direct the chip ahead of the tap (right hand thread) and are effective in through holes.

In reference to a specific application, taps with straight flutes are effective in materials such as cast iron that produce a short chip. In straight-flute taps, the flutes convey the chips out of the hole by storing them.

Figure 3:
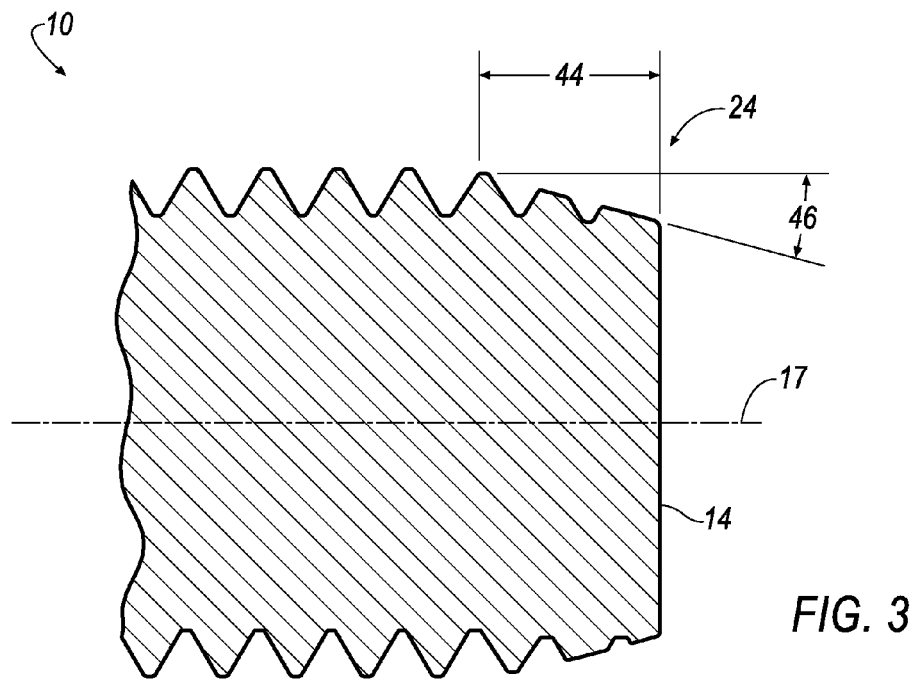
FIG. 3 is a partial, enlarged cross-sectional view of the threaded body portion of the axial forward end of the cutting tap of FIG. 1.
Figure 4:
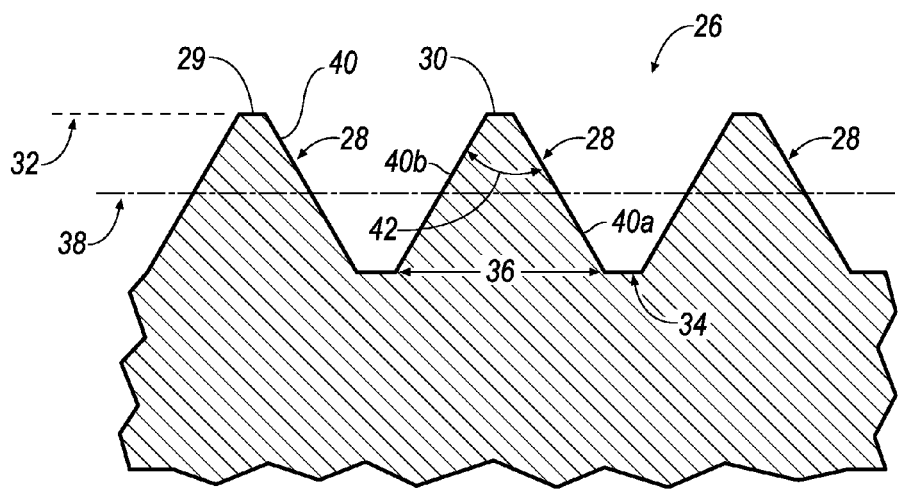
FIG. 4 is a partial, enlarged cross-sectional view of the constant-diameter fluted section of the spiral-fluted cutting tap of FIG. 1.

Referring now to FIGS. 3 and 4, the construction of the tap 10 and details about the cutting chamfer will now be described. The chamfered fluted section 24 has a length 44 and is formed at an angle 46 with respect to the central, longitudinal axis 17. The constant diameter (or finishing) fluted section 26 has a series of V-shaped cutting threads, shown generally at 28. Each cutting thread 28 has a cutting edge 29 and is truncated by a crest 30 at the major diameter 32 and a root 34 at the minor diameter 36. A pitch diameter 38, defined as the diameter in between the major and minor diameters 32, 36 effectively defines the location of a left thread flank 40a and a right thread flank 40b with respect to the longitudinal axis 17 of the cutting tap 10. Although FIG. 3A shows a thread 28 with an included angle 42 between the thread flanks 40a, 40b of about sixty (60) degrees, it should be appreciated that other angles are possible. For example, the included angle 42 can be in the range between about thirty (30) degrees and about ninety (90) degrees. After tapping, the thread flanks 40a, 40b and the thread crest 30 contact the newly generated internal thread. Generally, the minor diameter 36 of the tap 10 is intentionally designed to be larger than the minor diameter of the hole (not shown), and therefore, does not contact the internal thread.

The cutting tap 10 generates an internal thread form by the succession of cutting edges 29 formed by fluting the threaded body portion of the tap 10. Material is removed from the wall of the hole until the final thread form is obtained with the first full thread 28 on the constant diameter (or finishing) fluted section 26 of the tap 10. Threads past the first full thread 28 of the tap 10 are used to guide the tap accurately and allow the tap 10 to be resharpened after use.

Figure 5:
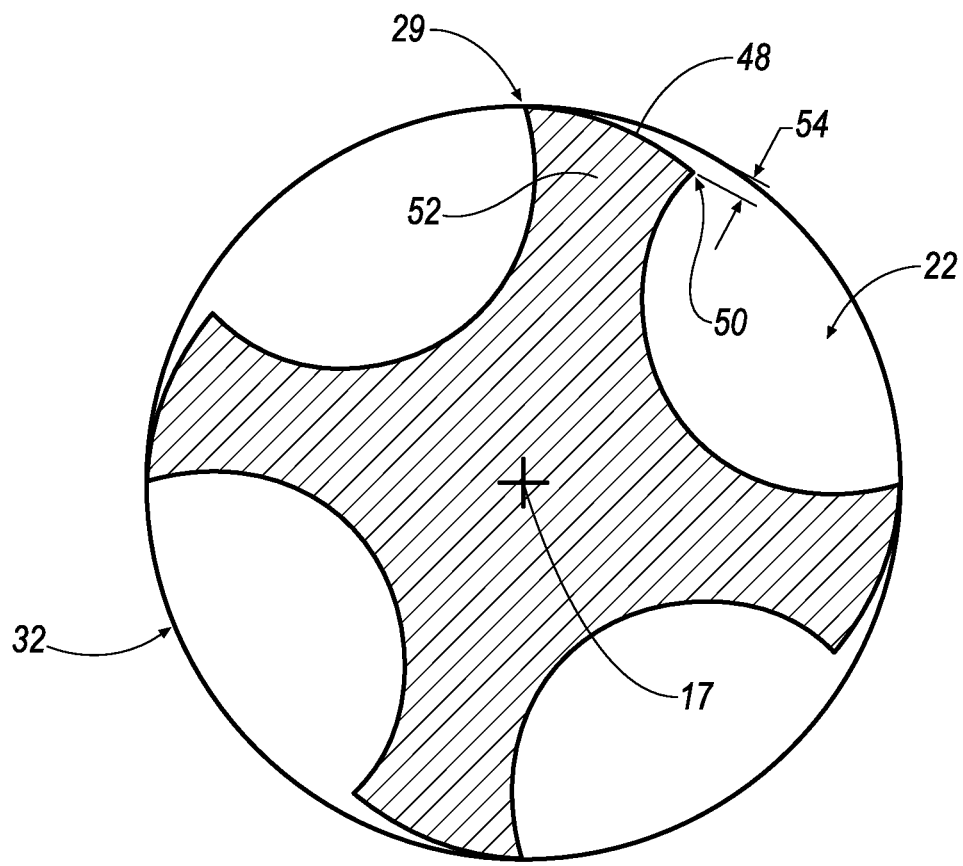
FIG. 5 is a cross-sectional view of a cutting thread with a chamfer relief according to an exemplary embodiment of the invention.

As shown in FIG. 5, each chamfered cutting edge 29 has a relieved chamfer surface 48 that follows the cutting edge during a cutting operation. The total amount of chamfer relief 54 is typically measured in the radial direction at the heel 50 of the land 52. It is important to have a specific amount of chamfer relief 54. Too little relief results in frictional rubbing between the tap and workpiece. Excessive amounts of relief result in a small included angle at the cutting edge between the flute face and chamfer surface. This condition results in weak cutting edges and chipping. Therefore, either insufficient or excessive relief will reduce the life of a tap.

Figures 6A, 6B:
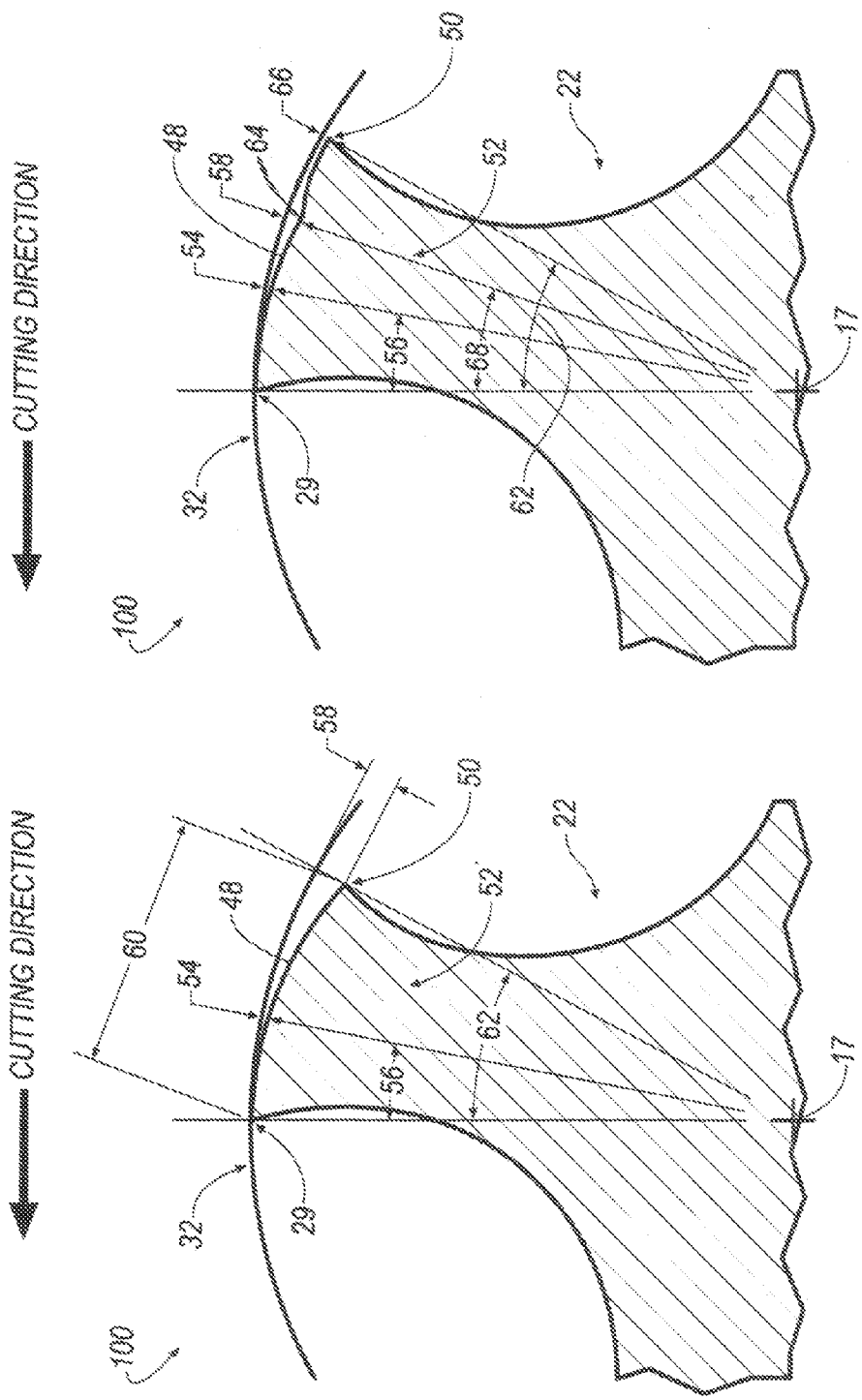
FIG. 6A is an enlarged cross-sectional view of the cutting thread with a conventional chamfer relief.
FIG. 6B is an enlarged cross-sectional view of the cutting thread with a chamfer relief and a clearance according to an exemplary embodiment of the invention.
Figure 7C:
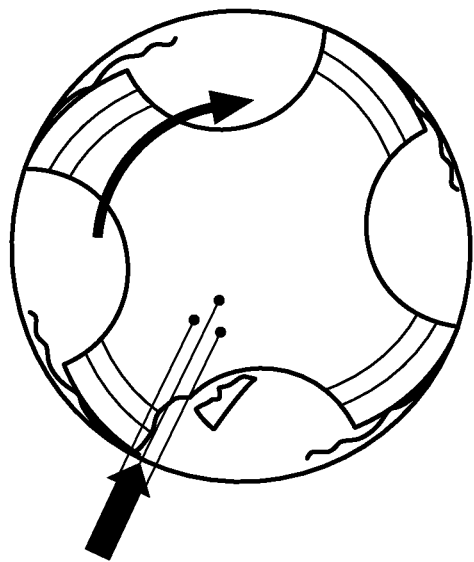
FIGS. 7A-C shows chip failure of a conventional cutting tap during a cutting operation when the cutting tap rotates in a forward direction (FIG. 7A), and then a reverse direction (FIGS. 7B and 7C).
Figure 7B:
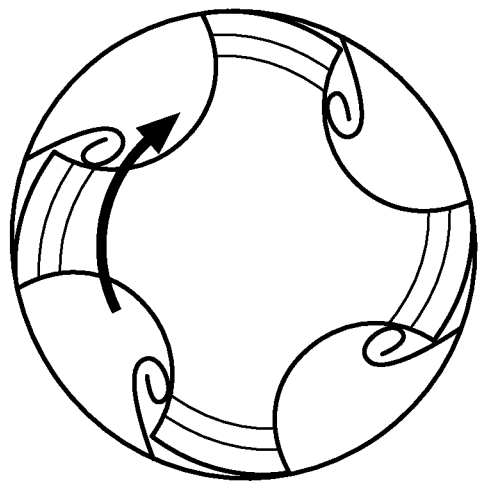
Figure 7A:
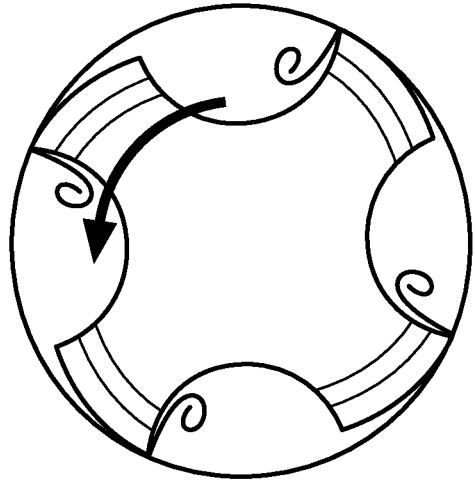

As shown in FIG. 6A, prior art taps 100 have a continuously relieved chamfer surface 48 extending from the cutting edge 29 to the land 52. The amount of chamfer relief 54, directed radially inward, is proportional to an angle 56 measured from the cutting edge 29. The amount of chamfer relief 54 increases from the cutting edge continuously over the width 60 of the land 52 of the tap to the heel 50 of the tap 100.

Thus, the maximum of the chamfer relief 58 is measured at the heel 50 and the land angle 62 and the angle of maximum chamfer relief are equal.

The invented tap is shown in FIG. 6B. Like prior art taps, the chamfer surface 48 is relieved radially inward from the cutting edge 29. Unlike prior art taps, the chamfer relief 54 stops increasing at a point 64 between the cutting edge 29 and the heel 50 (i.e., before reaching the heel 50 of the land 52). After the chamfer relief 54 reaches a maximum value, the chamfer surface 48 is directed radially outward so as to form a clearance 66 that is significantly smaller than the chamfer relief 54 at the heel 50 of the prior art tap 100. Because this clearance 66 is small, chips are unable to become wedged between the chamfer surface 48 and wall of the hole. Not only is chipping of the cutting edge 29 avoided, but also the relief from the cutting can be freely optimized.

The angle 68 of maximum relief of the invented tap depends on the width 60 of the land 52 and may range from fifteen percent (15%) to eighty-five percent (85%) of the land angle 62, depending on the application and materials tapped. An angle 68 of maximum relief of fifteen percent (15%) is appropriate for taps with a very large land angle 62, whereas eighty-five percent (85%) is suitable for taps with a very small land angle 62.

The shape of the recovered surface between the angle 68 of maximum relief and heel 50 is not critical and is influenced by the manufacturing method. The clearance 66 at the heel 50 is related to the chip thickness. Because the thickness of the chip is always equal to or greater than the feed on each cutting edge 29, the clearance 66 should be less than the feed per cutting edge in order to avoid the chip from becoming wedged between the chamfer surface 48 and the wall of the hole.

The invention can be applied to taps with any number of flutes or flute helix. For small diameter taps, two or three flutes are practical. For taps in the middle size range, four flutes are used and large size taps may have five flutes. The range of sizes may overlap with regards to the number of flutes that are used since this characteristic depends on the application. The invention can also apply to any chamfer lengths. Although taps used in blind holes typically have a chamfer length equal to or shorter than 3 thread pitches, taps with longer chamfer lengths (up to 10 thread pitches) can still be engaged in the workpiece when the tap reaches full tapping depth.

Method of Manufacturing

The tap 10 is manufactured from either a substrate comprised of tungsten carbide cemented with cobalt or from high-speed steel. The first step in processing the substrate is to grind the blank to precision cylindrical tolerances by methods such as cylindrical traverse grinding on centers or by centerless infeed grinding methods. During this step, a cylindrical shank is ground to size to form the cylindrical shank portion 18 at the axially rearward end 16 of the tap 10, and the major diameter 38 of the threaded body portion 20 is formed at the axially forward end 14 of the tap 10. In general, the diameter of the cylindrical shank portion 18 is approximately equal to the nominal thread diameter, but the diameter of the cylindrical shank portion 18 may be smaller than the nominal thread diameter for large diameter taps, and alternatively larger for small diameter taps. An option may include the grinding of the blank as part of the shank at the extreme axially rearward end of the tap 10.

In the next step, one or more flutes 22 are ground so as to provide cutting edges 44, in combination with the chamfer. The flutes 22 may be straight or helical, either right or left hand in any combination with either right or left hand threads.

In the next step, the threaded body portion 20 is ground to form V-shaped thread flank surfaces 40, along with minor and major diameters 36 and 32, on a helix. The V-shaped thread flank surfaces 40 and major diameter 38 replicate the internal screw thread that is generated during tapping. Depending on the tapping application, the thread flank surfaces 40 and the minor and major diameters 36, 32 may or may not be relieved.

The chamfered fluted section 24 of the threaded body portion 20 is ground with a taper at an angle 46 so as to allow entry in the hole to be tapped and with a chamfer surface of increasing relief from the cutting edge to a point where the relief reaches a maximum, at an angle smaller than the land angle, and thereafter the chamfer surface has diminishing relief so as to create a small clearance at the heel of the tap. Although it is possible to produce this shape on straight fluted taps with conventional grinding machines where the relief is generated by cams, it is impossible to generate this shape on spiral fluted taps by this technique. For spiral fluted taps, CNC tool grinders can be programmed to generate the invented shape.

After grinding, the tap 10 may be honed with abrasive media or abrasive brushes so as to form a small radius on the cutting edges and other sharp corners. The resulting radius may be between 0 and 100 microns. This honing further increases the strength of these edges.

As a final step in the process, the tap 10 may be optionally coated with a wear resistant layer (not shown) of metal nitrides, carbides, carbonitrides, borides and/or oxides, wherein the metal is chosen from one or more of the following: aluminum, silicon and the transition metals from Groups IVa, Va, and VIa of the Periodic Chart. This layer is deposited as a single monolayer or in multiple, including alternating, layers. Low friction layers can also be deposited on top of these wear resistant layers.

Benefit

The tap of the invention has numerous advantages over existing tap technology by reducing chipping of cutting edges of taps when the tap reverses while still engaged in cutting a thread, such as when tapping blind holes. Reduction of chipping allows the use of more heat and wear resistant but lower strength substrates such as cemented tungsten carbide. In addition, the tap of the invention has numerous advantages over existing tap technology by improving the accuracy, tool-life and speed by which internal screw threads can be produced.

The patents and publications referred to herein are hereby incorporated by reference.

Having described presently preferred embodiments the invention may be otherwise embodied within the scope of the appended claims.

What is claimed is:

1. A cutting tap comprising a body having an axial forward end and an axial rearward end, the body having a threaded body portion with spiral flutes adjacent the axial forward end, a cylindrical shank portion adjacent the axial rearward end and a central, longitudinal axis, the threaded body portion including a chamfered fluted section and a constant diameter section, the chamfered fluted section extending from the axial forward end and terminating at the constant diameter section, the constant diameter section including a cutting thread, a cutting edge formed at an intersection between the spiral flute and the cutting thread, and a chamfer surface having a chamfer relief extending radially inward from the cutting edge toward a heel of a land, wherein the chamfer surface has an inwardly-inclining convex profile such that an amount of chamfer relief gradually and continuously increases until a maximum value at a point between the cutting edge and the heel, and wherein the chamfer surface extending between the point of the maximum value of the chamfer relief and the heel is directed radially outward so as to form a clearance at the heel of the land that is smaller than the maximum value of the chamfer relief.

2. The cutting tap according to claim 1, wherein the clearance is less than the feed per cutting edge.

3. The cutting tap according to claim 1, wherein an angle formed between the cutting edge and the point of the maximum value of the chamfer relief is not equal to a land angle.

4. The cutting tap according to claim 3, wherein the angle is in a range between fifteen percent and eighty-five percent of the land angle.

5. A cutting tap comprising a body having an axial forward end and an axial rearward end, the body having a threaded body portion with spiral flutes adjacent the axial forward end, a cylindrical shank portion adjacent the axial rearward end and a central, longitudinal axis, the threaded body portion including a chamfered fluted section and a constant diameter section, the chamfered fluted section extending from the axial forward end and terminating at the constant diameter section, the constant diameter section including a cutting thread, a cutting edge formed at an intersection between the spiral flute and the cutting thread, and a chamfer surface having a chamfer relief extending radially inward from the cutting edge toward a heel of a land, wherein the chamfer surface has an inwardly-inclining convex profile such that an amount of chamfer relief gradually and continuously increases until a maximum value at a point between the cutting edge and the heel, and wherein an angle formed between the cutting edge and the point of the maximum value of the chamfer relief is not equal to a land angle.

6. The cutting tap according to claim 5, wherein the angle is in a range between fifteen percent and eighty-five percent of the land angle.

7. The cutting tap according to claim 5, wherein the chamfer surface extending between the point of the maximum value of the chamfer relief and the heel and is directed radially outward so as to form a clearance at the heel of the land that is smaller than the maximum value of the chamfer relief.

8. The cutting tap according to claim 7, wherein the clearance is less than the feed per cutting edge.

\* \* \* \* \*